US012109572B2

(12) United States Patent
Feng et al.

(10) Patent No.: US 12,109,572 B2
(45) Date of Patent: Oct. 8, 2024

(54) USE METHOD OF GRAVITY DOUBLE-TUBE MICROWAVE-ASSISTED GRINDING DEVICE CAPABLE OF CONTROLLING ORE THICKNESS

(71) Applicant: Northeastern University, Shenyang (CN)

(72) Inventors: Xiating Feng, Shenyang (CN); Feng Lin, Shenyang (CN); Shiping Li, Shenyang (CN); Xiangxin Su, Shenyang (CN); Jiuyu Zhang, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 225 days.

(21) Appl. No.: 17/792,592

(22) PCT Filed: May 21, 2020

(86) PCT No.: PCT/CN2020/091553
§ 371 (c)(1),
(2) Date: Jul. 13, 2022

(87) PCT Pub. No.: WO2021/227120
PCT Pub. Date: Nov. 18, 2021

(65) Prior Publication Data

US 2023/0083396 A1 Mar. 16, 2023

(30) Foreign Application Priority Data

May 9, 2020 (CN) ........................ 202010386164.8

(51) Int. Cl.

| | |
|---|---|
| ***B02C 19/18*** | (2006.01) |
| ***B02C 23/00*** | (2006.01) |
| ***B02C 23/02*** | (2006.01) |

(52) U.S. Cl.
CPC ............ *B02C 19/186* (2013.01); *B02C 23/02* (2013.01)

(58) Field of Classification Search
CPC ........ B02C 19/186; B02C 23/02; B02C 23/00
See application file for complete search history.

(56) References Cited

U.S. PATENT DOCUMENTS

| | | | | |
|---|---|---|---|---|
| 4,565,913 A * | 1/1986 | Yatsurugi | ................ | C30B 15/00 219/709 |
| 2011/0011853 A1 | 1/2011 | Kyle | | |
| 2015/0167230 A1 * | 6/2015 | Russell | .................. | D06H 7/225 241/23 |

FOREIGN PATENT DOCUMENTS

| | | |
|---|---|---|
| CN | 101547549 A | 9/2009 |
| CN | 104470022 A | 3/2015 |

(Continued)

*Primary Examiner* — Mohammed S. Alawadi

(74) *Attorney, Agent, or Firm* — Muncy, Geissler, Olds & Lowe, P.C.

(57) ABSTRACT

Provided is a use method of a gravity double-tube microwave-assisted grinding device capable of controlling ore thickness. The method comprises the following steps: step 1, estimating a metal mineral content of ores; step 2, calculating a penetration depth of the ores, step 3, determining a feeding size; step 4, determining a material thickness; step 5, determining a discharging speed $V_{p0}$; step 6, determining whether the gravity double-tube microwave-assisted grinding device capable of controlling ore thickness adopts a single-tube structure or a double-tube structure; and step 7, conveying the ores, performing heating, optimizing material parameters of the ores, and optimizing microwave parameters. By determining the feeding size of the ores and the material thickness, whether the gravity double-tube microwave-assisted grinding device capable of controlling ore thickness adopts the single-tube structure or the double-tube (Continued)

structure is determined, and the assisted grinding efficiency of a microwave equipment on the ores is improved.

5 Claims, 5 Drawing Sheets

(56) References Cited

FOREIGN PATENT DOCUMENTS

| | | | |
|---|---|---|---|
| CN | 105944810 | A | 9/2016 |
| CN | 106304457 | A | 1/2017 |
| CN | 206100526 | U | 4/2017 |
| CN | 109046529 | A | 12/2018 |

* cited by examiner

| Estimation method | Test method | Feeding size | Material thickness |
| --- | --- | --- | --- |
| For high metal mineral content and massive distribution of the metal mineral structure | The penetration depth of the massive samples is less than 10mm | The size of the finely-ground products (<14mm) | 10-20cm |
| For medium metal mineral content and punctate distribution or vein distribution of the metal mineral structure | The penetration depth of the massive samples is 10-50mm | The size of the medium-ground products (<50mm) | 20cm |
| For other situations, judgement is performed by the test method | The penetration depth of the massive samples is greater than 50mm | Ores are not suitable for microwave-assisted ore grinding | |

FIG. 5

USE METHOD OF GRAVITY DOUBLE-TUBE MICROWAVE-ASSISTED GRINDING DEVICE CAPABLE OF CONTROLLING ORE THICKNESS

BACKGROUND OF THE INVENTION

1. Field of the Invention

The invention relates to the technical field of assisted grinding of ores, in particular to a use method of a gravity double-tube microwave-assisted grinding device capable of controlling ore thickness.

2. The Prior Arts

Ore grinding is an extremely energy-consumption work. In the traditional ore grinding method, only 1-2% of energy can be effectively used, and at the same time, a large amount of steel loss can be generated, so that increasing the energy utilization rate of the ore grinding process and reducing the energy consumption of ore grinding are urgent problems to be solved.

As a new heating method, microwave has been widely used in life. Microwave-assisted ore grinding is to use microwave energy to heat ores to cause temperature difference between microwave absorbing minerals and transparent minerals inside the ores, and enable the ores to crack, thereby improving the grindability of the ores. A large number of experiments have shown that microwave-assisted ore grinding can reduce energy consumption of ore grinding. Metal sulfides and most metal oxides both have good microwave absorbing properties, which indicate that most metal ores can interact with microwaves, so that the microwave-assisted ore grinding equipment developed for industrial applications also has general applicability.

If the microwave-assisted ore grinding equipment is developed for industrial applications, high-power, short-time irradiation and large-scale continuous flow of the ores need to be achieved. It is difficult for ordinary conveyor belts to meet requirements of high temperature resistance, fire resistance, good wave permeability, strong bearing capacity and low loss through high-power microwave heaters at the same time. At current, foreign countries can meet the requirement by using gravity ore break down by a single-layer quartz tube through a rectangular waveguide. But the disadvantage of the single tube lies in that when the device is used with a microwave source with a frequency of 915 MHz and high power of 100 kW, the optimal diameter of a gravity ore break down pipeline passing through the rectangular waveguide should be slightly smaller than the width of the WR975 waveguide (24.8 cm), and the diameter of the pipeline should not be adjusted greatly (reducing the diameter of the pipeline will lead to idle microwave irradiation, thereby causing energy waste), which leads to unadjustable thickness of the ores, and seriously affects the efficiency of microwave-assisted ore grinding and the applicable type of the ores. During irradiation on different types of ores, especially ores with high metal mineral content, the thickness of the ores obtained by single-tube ore break down is too large and the microwave heating depth is small, therefore the irradiation effect of the ores on the surface of the pipeline and the irradiation effect of the ores inside the pipeline are becoming seriously polarized. There are two situations in surface ores and internal ores: one is that the ores on the surface of the pipeline produce an assisted grinding effect, but the internal ores do not change; the other is that the internal ores produce the assisted grinding effect, but the ores on the surface are excessively irradiated to waste energy and even the sintering phenomenon occurs to increase the ore grinding difficulty. Based on this, it is necessary to propose a microwave-assisted ore grinding device with adjustable ore thickness, which can realize the matching of ore thickness and microwave heating depth, thereby improving the efficiency of microwave-assisted ore grinding.

SUMMARY OF THE INVENTION

The invention aims to overcome the defects of the prior art, and aims to provide a gravity double-tube microwave-assisted grinding device capable of controlling ore thickness and a use method. Gravity double tubes are used, ore break down is realized through coaxial inner and outer tubes, and the thickness of the ores can be changed by a method of changing the outer diameter of an inner tube, so that the matching between the thickness of the ores and the range of microwave action can be realized. A use method for equipment is proposed to determine the feeding size of the ores and the material thickness of the ores, which match the action of the microwave, so as to realize optimization of the efficiency of microwave-assisted ore grinding.

In order to achieve the above purpose, the invention adopts the following technical scheme.

The gravity double-tube microwave-assisted grinding device capable of controlling ore thickness comprises a microwave heating device and a conveying platform, wherein the microwave heating device comprises a microwave source, a tuner, a waveguide, and a water load: an output end of the microwave source is connected with one end of the tuner, another end of the tuner is connected with the waveguide, the water load is arranged at a tail end of the waveguide along a radial direction and absorbs excess microwave energy, and a circular through hole is formed in a middle of a horizontal section of the waveguide: the conveying platform comprises a feeding bin, a feeder, a feeding hopper, a choke coil, a metal tube, a quartz tube, and a discharger: an inlet end of the feeding bin is connected with an upstream process product feeding system for storing materials fed from an upstream process, an outlet end of the feeding bin is connected with an inlet end of the feeder, and the feeder conveys ores from the feeding bin to the feeding hopper, and controls a speed of the feeder and a speed of the discharger are controlled to be matched with each other so as to prevent overflow of the materials from the feeding hopper; an outlet end of the feeder is located above the feeding hopper, an outlet end of the feeding hopper is connected with an upper end of an upper section of the metal tube, a lower end of an upper section of the metal tube is connected with one end of the quartz tube, another end of the quartz tube passes through a circular through hole in the waveguide and is connected with one end of a lower section of the metal tube, another end of the lower section of the metal tube is connected with an inlet end of the discharger, an outlet end of the discharger is connected with a downstream grinding equipment, and the discharger is a star discharger for controlling a discharging speed of the materials, so as to control the heating time of the ores; an outer surface of the upper section of the metal tube, an outer surface of the waveguide and an outer surface of the lower section of the metal tube are wrapped with the choke coil, so as to limit escape of microwave energy; and a through hole allowing the waveguide to pass through is formed in the choke coil, shooting devices are respectively mounted at a microwave input end and a microwave output end of the waveguide, so as to monitor macro phenomena and temperature during ore irradiation.

The upper section of the metal tube and the lower section of the metal tube have the same structure, and include two situations, when the metal tube is the double-tube structure, the metal tube comprises the metal inner tube and the metal outer tube, and the metal outer tube sleeves on the metal inner tube; when the metal tube is the single-tube structure, the upper section of the metal tube and the lower section of the metal tube are respectively the metal outer tube of the upper section of the metal tube and the metal outer tube of the lower section of the metal tube; the quartz tube includes two situations, when the quartz tube is the double-tube structure, the quartz tube comprises the quartz inner tube and the quartz outer tube, and the quartz outer tube sleeves on the quartz inner tube: when the quartz tube is the single-tube structure, the quartz tube is the quartz outer tube; and inner tube sealing plugs are mounted in the metal inner tube and the quartz inner tube.

Each shooting device comprises a shielding box, the high-speed camera and the infrared thermal imager, wherein the high-speed cameras and the infrared thermal imagers are mounted in the shielding boxes, and the two shielding boxes are respectively mounted at the microwave input end and the microwave output end of the waveguide.

The outer diameters of the metal outer tube and the quartz outer tube are 20-23 cm.

The outer diameters of the metal inner tube and the quartz inner tube are determined by the type of the ores.

The use method of the gravity double-tube microwave-assisted grinding device capable of controlling ore thickness comprises the following steps.

Step 1, estimating a metal mineral content of the ores according to a proportion of the metal mineral area on surfaces of the ores, wherein the metal mineral content is classified into high content (>50%), medium content (10-50%) and low content (<10%).

Step 2, calculating a penetration depth of the ores, testing dielectric constants of massive samples and granular samples of the ores respectively by a vector network analyzer in a laboratory, and substituting a real part and an imaginary part of a dielectric constant of massive ores into an equation (1) to calculate $D_p$, wherein at this time, a penetration depth $L_b$ of the massive ores is equal to $D_p$; substituting a real part and an imaginary part of a dielectric constant of granular ores into the equation (1) to calculate $D_p$, wherein at this time, a penetration depth $L_p$ of the granular ores is equal to $D_p$:

$$D_P = \frac{\lambda_0}{2\pi\sqrt{2\varepsilon'}}\left\{\left[1+\left(\frac{\varepsilon''}{\varepsilon'}\right)^2\right]^{1/2}-1\right\}^{-1/2} \quad (1)$$

Wherein $D_p$ is the penetration depth, $\lambda_0$ is a wavelength, ε' is a real part of the dielectric constant, and ε" is an imaginary part of the dielectric constant.

Step 3, determining a feeding size by using an on-site estimation method and a test method.

(1) The on-site estimation method: performing estimation according to the metal mineral content and a metal mineral structure on the surfaces of the ores.

For high metal mineral content and massive distribution of the metal mineral structure, estimating that the feeding size is a size of finely-ground products (<14 mm).

For medium metal mineral content and punctate distribution or vein distribution of the metal mineral structure, estimating that the feeding size is a size of medium-ground products (<50 mm).

For other cases, selecting the test method for determination.

(2) The test method: the penetration depth $L_b$ of the massive ores, calculated according to step 2.

When the penetration depth $L_b$ of the massive ore samples is less than 10 mm, determining that the feeding size is the size of the finely-ground products (<14 mm).

When the penetration depth $L_b$=(10-50) mm of the massive ore samples, determining that the feeding size is the size of the medium-ground products (<50 mm).

When the penetration depth $L_b$ of the massive ore samples is greater than 50 mm, determining that the ores are not suitable for microwave-assisted ore grinding.

Step 4: determining a material thickness, wherein according to the feeding size determined in step 3, the material thickness is classified into two categories.

(1) When the feeding size is the size of the medium-ground products, determining that the material thickness is 20 cm.

(2) When the feeding size is the size of the finely-ground products, determining that the material thickness is 10-20 cm; when the feeding size is the size of the finely-ground products, and the penetration depth $L_p$ of the granular ores is less than 5 cm, determining that the material thickness is 10 cm.

Step 5: determining a discharging speed $V_{p0}$ (kg/s) of the feeding hopper, given a feeding speed $T_m$ (kg/s) of the feeding bin, the discharging speed $V_{p0}$ is calculated by an equation (2):

$$V_{p0}=T_m \quad (2)$$

Step 6, determining an outer diameter of an inner tube of the microwave-assisted grinding device.

Wherein when the feeding size calculated in step 3 is the size of the medium-ground products, a metal inner tube of the upper section of the metal tube, a quartz inner tube and a metal inner tube of the lower section of the metal tube are not provided, the gravity microwave-assisted grinding device adopts a single-tube structure consisting of a metal outer tube of the upper section of the metal tube, a quartz outer tube and a metal outer tube of the lower section of the metal tube, a heating cavity is formed in an inner hole of the metal outer tube of the upper section of the metal tube, the quartz outer tube and the metal outer tube of the lower section of the metal tube, and outer diameters of the metal outer tube of the upper section of the metal tube, the quartz outer tube and the metal outer tube of the lower section of the metal tube are respectively 20 cm.

When the feeding size calculated in step 3 is the size of the finely-ground products, the metal inner tube of the upper section of the metal tube, the quartz inner tube and the metal inner tube of the lower section of the metal tube are provided, and the gravity microwave-assisted grinding device adopts a double-tube structure consisting of the metal outer tube of the upper section of the metal tube, the quartz outer tube, the metal outer tube of the lower section of the metal tube, the metal inner tube of the upper section of the metal tube, the quartz inner tube and the metal inner tube of the lower section of the metal tube; and the outer tube and the inner tube form the heating cavity, outer diameters of the metal inner tube of the upper section of the metal tube, the quartz inner tube and the metal inner tube of the lower section of the metal tube are 5 cm, and when the penetration depth $L_p$ of the granular ores is less than 5 cm, the outer diameters of the metal inner tube of the upper section of the metal tube, the quartz inner tube and the metal inner tube of the lower section of the metal tube are increased to 10 cm.

Step 7, conveying the ores, and performing heating, wherein the ores fall from the feeding hopper and pass through the heating cavity under an action of self-gravity, a microwave power of the microwave source is 100 kW, the ores are transferred into the heating cavity through the waveguide, microwave energy is limited in the heating cavity under an action of the choke coil to prevent the microwave energy from escaping, the microwave energy in the heating cavity is used to heat the ores, and in the heating process of the ores, if a spark phenomenon is severe, the feeding size of the ores is reduced; if a temperature distribution of the ores is becoming seriously polarized, the material thickness of the ores fed is reduced; in the heating process of the ores, high-speed cameras are used for shooting the macro phenomena during the ore irradiation, infrared thermal imagers are used for observing the temperature distribution of the ores, and the feeding size of step 3 and the discharging speed of step 5 are optimized: the heated ores enter the discharger and then enter the downstream grinding equipment through the discharger: if poor ore damage situations have no effect on ore grinding, an irradiation time can be prolonged by reducing the discharging speed, and meanwhile, excess ores in the feeding bin are discharged from other outlets into another gravity microwave-assisted grinding device capable of controlling ore thickness; and if ore sintering has a negative effect on the ore grinding, the microwave power is reduced.

The device adopting the technical scheme has the beneficial effects: (1) the gravity double-tube microwave-assisted grinding device capable of controlling ore thickness is provided, by using flowing ores between the inner and outer tubes of coaxial double tubes, the outer diameter of the inner tube can be changed, and thus the material thickness can be adjusted, thereby preventing the ore irradiation effect of the surface ores and the ore irradiation effect of the inner ores from being becoming seriously polarized by unadjustable thickness of the ores; and (2) the use method of the gravity double-tube microwave-assisted grinding device capable of controlling ore thickness is provided, and the feeding size and the material thickness of the ores, matching with the microwave action, are determined, so that the application of the microwave-assisted grinding equipment is enlarged and the assisted ore grinding efficiency of the microwave equipment on the ores is improved.

BRIEF DESCRIPTION OF DRAWINGS

FIG. 3(*a*) shows a single-tube structure; FIG. 3(*b*) shows a double-tube structure.

FIG. 5 is a schematic diagram of a division standard of feeding size.

1: feeding bin, 2: feeder, 3: feeding hopper, 4: inner tube sealing plug, 5: choke coil, 6: metal outer tube, 7: metal inner tube, 8: quartz outer tube, 9: quartz inner tube, 10: heating cavity, 12: flange, 13: discharger, 14: waveguide, 15: tuner, 16" microwave source, 17: shielding box, 18: high-speed camera, and 19: infrared thermal imager.

DETAILED DESCRIPTION OF THE PREFERRED EMBODIMENT

The invention will be described in further detail below with reference to the accompanying drawings and embodiments.

Figure 1:
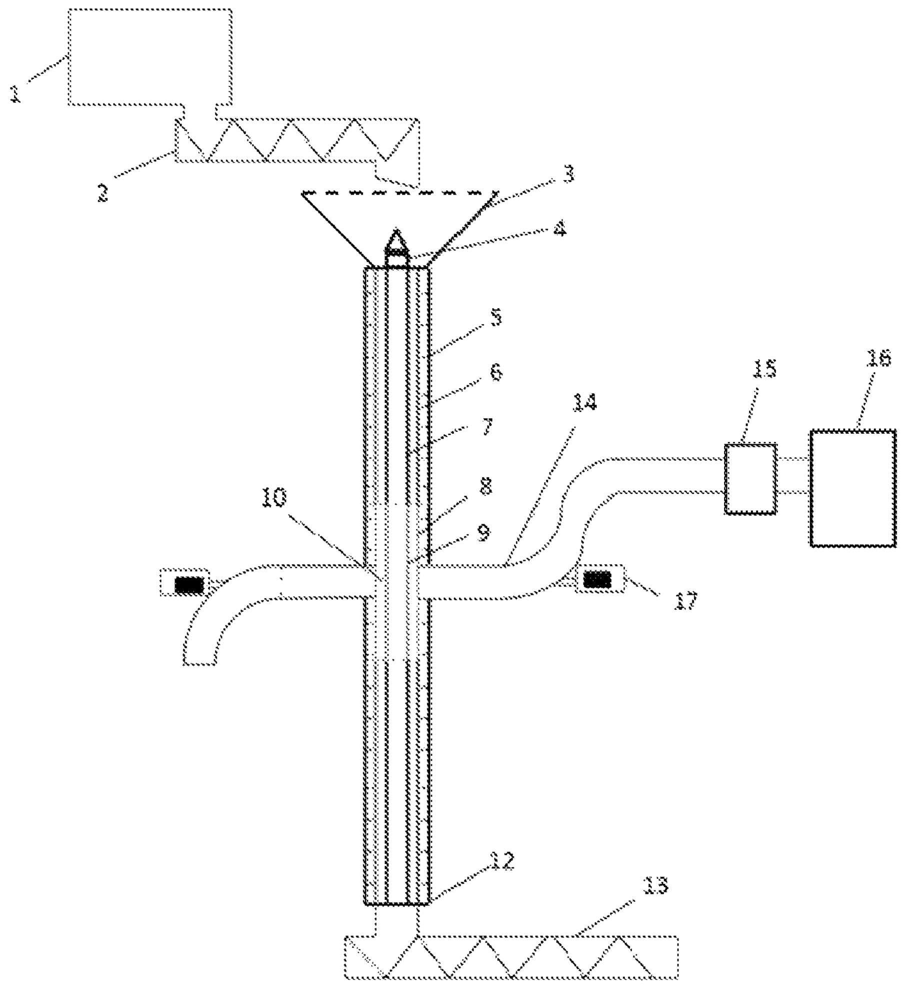
FIG. 1 shows a structural schematic view of a gravity double-tube microwave-assisted grinding device capable of controlling ore thickness.
Figure 2:
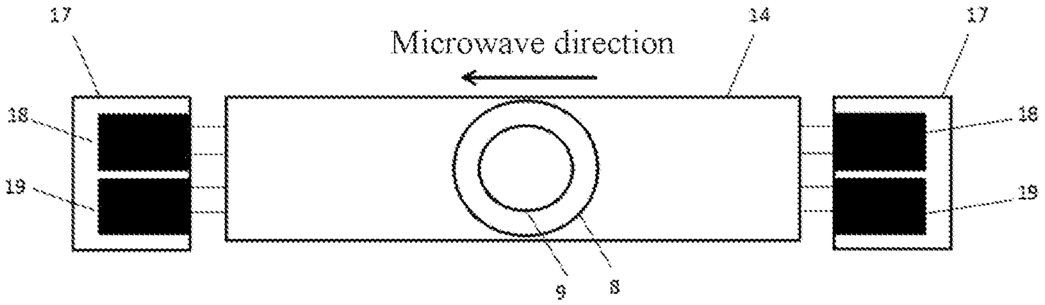
FIG. 2 shows a partially structural top view of the gravity double-tube microwave-assisted grinding device capable of controlling ore thickness.
Figure 3:
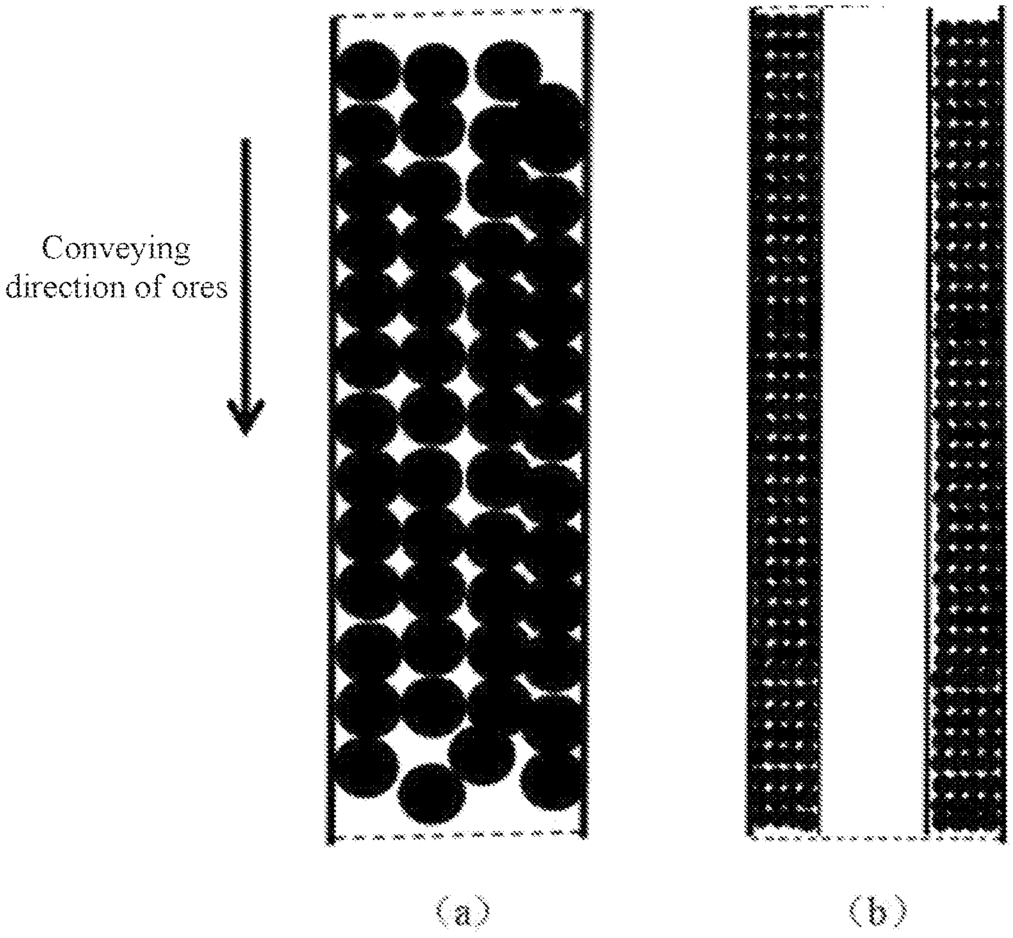
FIG. 3 shows is a schematic diagram of the conveying of the gravity double-tube microwave-assisted grinding device capable of controlling ore thickness.

As shown in FIG. 1 to FIG. 3, the gravity double-tube microwave-assisted grinding device capable of controlling ore thickness comprises a microwave heating device and a conveying platform, wherein the microwave heating device comprises a microwave source 16, a tuner 15, a WR975 waveguide 14, and a water load: an output end of the microwave source 16 is connected with one end of the tuner 15, another end of the tuner 15 is connected with the waveguide 14, the water load is arranged at a tail end of the waveguide 14 along a radial direction and absorbs excess microwave energy, and a circular through hole is formed in a middle of a horizontal section of the waveguide 14; the conveying platform comprises a feeding bin 1, a feeder 2, a feeding hopper 3, a choke coil 5, a metal tube, a quartz tube, and a discharger 13: an inlet end of the feeding bin 1 is connected with an upstream process product feeding system for storing materials fed from an upstream process, an outlet end of the feeding bin 1 is connected with an inlet end of the feeder 2, and the feeder 2 conveys ores from the feeding bin 1 to the feeding hopper 3, and a speed of the feeder 2 a speed of the discharger are controlled to be matched with each other so as to prevent overflow of the materials from the feeding hopper 3: an outlet end of the feeder 2 is located above the feeding hopper 3, an outlet end of the feeding hopper 3 is connected with an upper end of the upper section of the metal tube through a flange 12, a lower end of the upper section of the metal tube is connected with one end of the quartz tube, another end of the quartz tube passes through a circular through hole in the waveguide 14 and is connected with one end of a lower section of the metal tube, another end of the lower section of the metal tube is connected with an inlet end of the discharger 13 through the flange 12, an outlet end of the discharger 13 is connected with a downstream grinding equipment, and the discharger 13 is a star discharger for controlling a discharging speed of the materials, so as to control the heating time of the ores; outer surfaces of the upper section of the metal tube, the waveguide 14 and the lower section of the metal tube are wrapped with the choke coil 5, so as to limit escape of microwave energy; and a through hole allowing the waveguide 14 to pass through is formed in the choke coil 5, shooting devices are respectively mounted at a microwave input end and a microwave output end of the waveguide 14, so as to monitor macro phenomena and temperature during ore irradiation.

The upper section of the metal tube and one end of the quartz tube are connected in the manner of clamping grooves, and the other end of the quartz tube and the lower section of the metal tube are connected in the manner of clamping grooves.

The upper section of the metal tube and the lower section of the metal tube have the same structure, and include two situations, when the metal tube is the double-tube structure, the metal tube comprises the metal inner tube 7 and the metal outer tube 6, and the metal outer tube 6 sleeves on the metal inner tube 7; when the metal tube is the single-tube structure, the upper section of the metal tube and the lower section of the metal tube are respectively the metal outer tube 6 of the upper section of the metal tube and the metal outer tube 6 of the lower section of the metal tube; the quartz tube includes two situations, when the quartz tube is the double-tube structure, the quartz tube comprises the quartz inner tube 9 and the quartz outer tube 8, and the quartz outer tube 8 sleeves on the quartz inner tube 9; when the quartz tube is the single-tube structure, the quartz tube is the quartz outer tube 8; and when the quartz tube is the double-tube structure, inner tube sealing plugs 4 are mounted in the metal inner tube 7 and the quartz inner tube 9.

Each shooting device comprises a shielding box 17, the high-speed camera 18 and the infrared thermal imager 19, wherein the high-speed cameras 18 and the infrared thermal imagers 19 are mounted in the shielding boxes 17, and the two shielding boxes 17 are respectively mounted at the microwave input end and the microwave output end of the waveguide 14.

The outer diameters of the metal outer tube 6 and the quartz outer tube 8 are 20 cm.

The outer diameters of the metal inner tube 7 and the quartz inner tube 9 are determined by the type of the ores.

The maximum power of the microwave source 16 is 100 kW.

Figure 4:
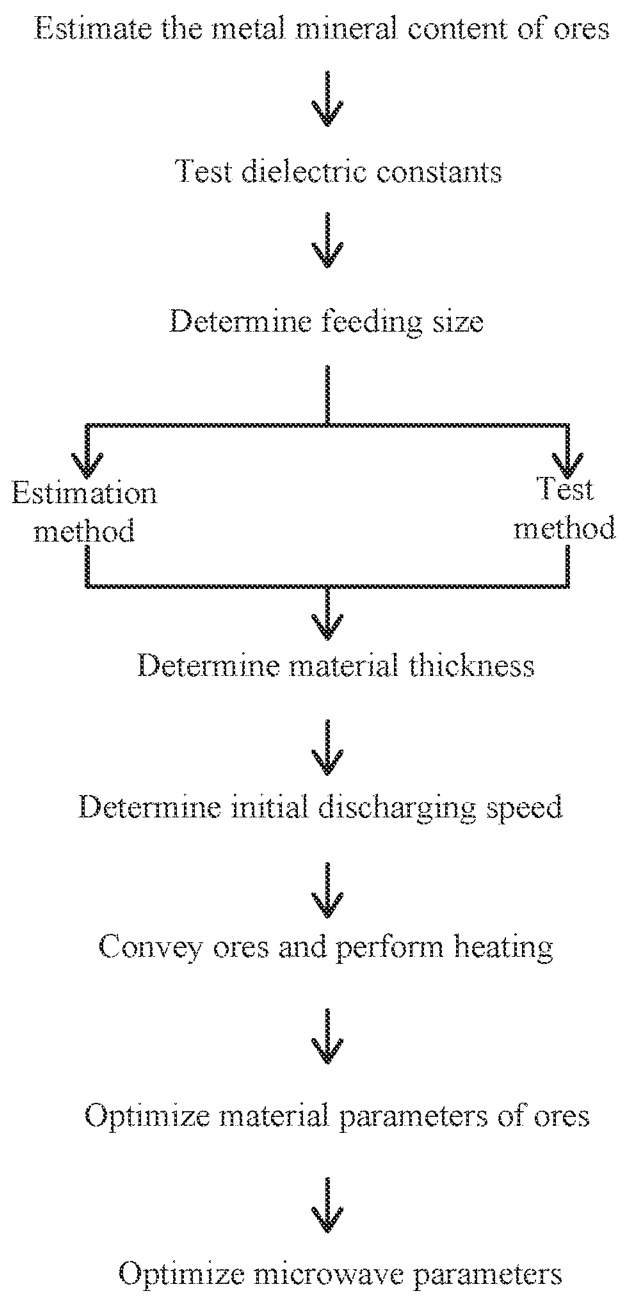
FIG. 4 is a flow chart of a use method of the gravity double-tube microwave-assisted grinding device capable of controlling ore thickness.

The use method of the gravity double-tube microwave-assisted grinding device capable of controlling ore thickness, as shown in FIG. 4 and FIG. 5, comprises the following steps.

Step 1, estimating a metal mineral content of the ores according to a proportion of a metal mineral area on surfaces of the ores, wherein the metal mineral content is classified into high content (>50%), medium content (10-50%) and low content (<10%).

Step 2, calculating a penetration depth of the ores, testing dielectric constants of massive samples and granular samples of the ores respectively by a vector network analyzer in a laboratory, and substituting a real part and an imaginary part of a dielectric constant of massive ores into an equation (1) to calculate $D_p$, wherein at this time, a penetration depth $L_b$ of the massive ores is equal to $D_p$; substituting a real part and an imaginary part of a dielectric constant of granular ores into the equation (1) to calculate $D_p$, wherein at this time, a penetration depth $L_p$ of the granular ores is equal to $D_p$:

$$D_P = \frac{\lambda_0}{2\pi\sqrt{2\varepsilon'}}\left\{\left[1+\left(\frac{\varepsilon''}{\varepsilon'}\right)^2\right]^{1/2}-1\right\}^{-1/2} \quad (1)$$

Wherein $D_p$ is the penetration depth, $\lambda_0$ is a wavelength, ε' is a real part of the dielectric constant, and ε" is an imaginary part of the dielectric constant.

Step 3, determining a feeding size by using an on-site estimation method and a test method.

(1) The on-site estimation method: performing estimation according to the metal mineral content and a metal mineral structure on the surfaces of the ores.

For high metal mineral content and massive distribution of the metal mineral structure, estimating that the feeding size is a size of finely-ground products (<14 mm).

For medium metal mineral content and punctate distribution or vein distribution of the metal mineral structure, estimating that the feeding size is a size of medium-ground products (<50 mm).

For other cases, selecting the test method for determination.

(2) The test method: the penetration depth $L_b$ of the massive ores, calculated according to step 2.

When the penetration depth $L_b$ of the massive ore samples is less than 10 mm, determining that the feeding size is the size of the finely-ground products (<14 mm).

When the penetration depth $L_b$=(10-50) mm of the massive ore samples, determining that the feeding size is the size of the medium-ground products (<50 mm).

When the penetration depth $L_b$ of the massive ore samples is greater than 50 mm, determining that the ores are not suitable for microwave-assisted ore grinding.

Step 4: determining the material thickness, wherein according to the feeding size determined in step 3, the material thickness is classified into two categories.

(1) When the feeding size is the size of the medium-ground products, determining that the material thickness is 20 cm.

(2) When the feeding size is the size of the finely-ground products, determining that the material thickness is 10-20 cm; when the feeding size is the size of the finely-ground products, and the penetration depth $L_p$ of the granular ores is less than 5 cm, determining that the material thickness is 10 cm.

Step 5: determining a discharging speed $V_{p0}$ (kg/s) of the feeding hopper, given a feeding speed $T_m$ (kg/s) of the feeding bin 1, the discharging speed $V_{p0}$ is calculated by an equation (2):

$$V_{p0}=T_m \quad (2)$$

Step 6, determining an outer diameter of an inner tube of the microwave-assisted grinding device.

Wherein when the feeding size calculated in step 3 is the size of the medium-ground products, the metal inner tube 7 of the upper section of the metal tube, the quartz inner tube 9 and the metal inner tube 7 of the lower section of the metal tube are not provided, the gravity microwave-assisted grinding device adopts a single-tube structure consisting of the metal outer tube 6 of the upper section of the metal tube, the quartz outer tube 8 and the metal outer tube 6 of the lower section of the metal tube, the heating cavity 10 is formed in the inner hole of the metal outer tube 6 of the upper section of the metal tube, the quartz outer tube 8 and the metal outer tube 6 of the lower section, and the outer diameters of the metal outer tube 6 of the upper section of the metal tube, the quartz outer tube 8 and the metal outer tube 6 of the lower section of the metal tube are respectively 20 cm.

When the feeding size calculated in step 3 is the size of the finely-ground products, the metal inner tube 7 of the upper section of the metal tube, the quartz inner tube 9 and the metal inner tube 7 of the lower section of the metal tube are provided, and the gravity microwave-assisted grinding device adopts a double-tube structure consisting of the metal outer tube 6 of the upper section of the metal tube, the quartz outer tube 8, the metal outer tube 6 of the lower section of the metal tube, the metal inner tube 7 of the upper section of the metal tube, the quartz inner tube 9 and the metal inner tube 7 of the lower section of the metal tube; and the outer tube and the inner tube form the heating cavity 10, outer diameters of the metal inner tube 7 of the upper section of the metal tube, the quartz inner tube 9 and the metal inner tube 7 of the lower section of the metal tube are 5 cm, and when the penetration depth $L_p$ of the granular ores is less than 5 cm, the outer diameters of the metal inner tube 7 of the upper section of the metal tube, the quartz inner tube 9 and the metal inner tube 7 of the lower section of the metal tube are increased to 10 cm.

Step 7, conveying the ores, and performing heating, wherein the ores fall from the feeding hopper 3 at the discharging speed $V_{P0}$ and pass through the heating cavity 10 under an action of self-gravity, a microwave power of the microwave source 16 is 100 kW, the ores are transferred into the heating cavity 10 through the waveguide 14, the microwave is transferred along the direction of the waveguide 14, microwave energy is limited in the heating cavity 10 under an action of the choke coil 5 to prevent the microwave energy from escaping, the microwave energy in the heating cavity 10 is used to heat the ores, and in the heating process of the ores, if a spark phenomenon is severe, the feeding size of the ores is reduced: if the temperature distribution of the ores is becoming seriously polarized, the material thickness of the ores fed is reduced: in the heating process of the ores, the high-speed cameras 18 are used for shooting the macro phenomena during ore irradiation, infrared thermal imagers 19 are used for observing the temperature distribution of the ores, and the feeding size of step 3 and the discharging speed of step 5 are optimized; the heated ores enter the discharger 13 and then enter the downstream grinding equipment through the discharger 13; if poor ore damage situations have no effect on ore grinding, an irradiation time can be prolonged by reducing the discharging speed, and meanwhile, excess ores in the feeding bin 1 are discharged from other outlets into another gravity microwave-assisted grinding device capable of controlling ore thickness; and if ore sintering has a negative effect on the ore grinding, the microwave power is reduced.

What is claimed is:

1. A use method of a gravity double-tube microwave-assisted grinding device, wherein the gravity double-tube microwave-assisted grinding device comprises a microwave heating device and a conveying platform; the microwave heating device comprises a microwave source, a tuner, a waveguide, and a water load; an output end of the microwave source is connected with one end of the tuner, another end of the tuner is connected with the waveguide, the water load is arranged at a tail end of the waveguide along a radial direction and absorbs an excess microwave energy, and a circular through hole is formed in a middle of a horizontal section of the waveguide; the conveying platform comprises a feeding bin, a feeder, a feeding hopper, a choke coil, a metal tube, a quartz tube, and a discharger; an inlet end of the feeding bin is connected with an upstream process product feeding system for storing materials fed from an upstream process, an outlet end of the feeding bin is connected with an inlet end of the feeder, and the feeder conveys ores from the feeding bin to the feeding hopper, and a speed of the feeder and a speed of the discharger are controlled to be matched with each other so as to prevent overflow of the materials from the feeding hopper; an outlet end of the feeder is located above the feeding hopper, an outlet end of the feeding hopper is connected with an upper end of an upper section of the metal tube, a lower end of the upper section of the metal tube is connected with one end of the quartz tube, another end of the quartz tube passes through the circular through hole in the waveguide and is connected with one end of a lower section of the metal tube, another end of the lower section of the metal tube is connected with an inlet end of the discharger, an outlet end of the discharger is connected with a downstream grinding equipment, and the discharger is a star discharger for controlling the speed of the discharger, so as to control a heating time of the ores; an outer surface of the upper section of the metal tube, an outer surface of the waveguide and an outer surface of the lower section of the metal tube are wrapped with the choke coil, so as to limit escape of a microwave energy; and a through hole allowing the waveguide to pass through is formed in the choke coil, shooting devices are respectively mounted at a microwave input end and a microwave output end of the waveguide, so as to monitor macro phenomena and temperature during ore irradiation, wherein the method comprises the following steps:

step 1, estimating a metal mineral content of the ores according to a proportion of a metal mineral area on surfaces of the ores, wherein the metal mineral content is classified into a high content (>50%), a medium content (10-50%) and a low content (<10%);

step 2, calculating a penetration depth of the ores, testing dielectric constants of massive samples and granular samples of the ores respectively by a vector network analyzer in a laboratory, and substituting a real part and an imaginary part of a dielectric constant of massive ores into an equation (1) to calculate $D_p$, wherein at this time, a penetration depth $L_b$ of the massive ores is equal to $D_p$; substituting a real part and an imaginary part of a dielectric constant of granular ores into the equation (1) to calculate $D_p$, wherein at this time, a penetration depth $L_p$ of the granular ores is equal to $D_p$;

$$D_P = \frac{\lambda_0}{2\pi\sqrt{2\varepsilon'}}\left\{\left[1+\left(\frac{\varepsilon''}{\varepsilon'}\right)^2\right]^{1/2}-1\right\}^{-1/2} \quad (1)$$

wherein $D_p$ is the penetration depth, $\lambda_0$ is a wavelength, ε' is a real part of the dielectric constant, and ε" is an imaginary part of the dielectric constant;

step 3, determining a feeding size by using an on-site estimation method and a test method;

(1) the on-site estimation method: performing estimation according to the metal mineral content and a metal mineral structure on the surfaces of the ores:

for the high content and a massive distribution of the metal mineral structure, estimating that the feeding size is a size of finely-ground products (<14 mm);

for the medium content and a punctate distribution or vein distribution of the metal mineral structure, estimating that the feeding size is a size of medium-ground products (<50 mm); and for other cases, selecting the test method for determination;

(2) the test method: the penetration depth $L_b$ of the massive ores, calculated according to step 2;

when the penetration depth $L_b$ of the massive ore samples is less than 10 mm, determining that the feeding size is the size of the finely-ground products (<14 mm);

when the penetration depth $L_b$=(10-50) mm of the massive ore samples, determining that the feeding size is the size of the medium-ground products (<50 mm); and when the penetration depth $L_b$ of the massive ore samples is greater than 50 mm, determining that the ores are not suitable for microwave-assisted ore grinding;

step 4: determining a material thickness, wherein according to the feeding size determined in step 3, the material thickness is classified into two categories:

(1) when the feeding size is the size of the medium-ground products, determining that the material thickness is 20 cm; and (2) when the feeding size is the size of the finely-ground products, determining that the material thickness is 10-20 cm; when the feeding size is the size of the finely-ground products, and the penetration depth $L_p$ of the granular ores is less than 5 cm, determining that the material thickness is 10 cm;

step 5: determining a discharging speed $V_{p0}$ (kg/s) of the feeding hopper, given a feeding speed $T_m$ (kg/s) of the feeding bin, the discharging speed $V_{p0}$ is calculated by an equation (2);

$$V_{p0}=T_m \quad (2)$$

step 6, determining an outer diameter of an inner tube of the microwave-assisted grinding device, wherein when the feeding size calculated in step 3 is the size of the medium-ground products, a metal inner tube of the upper section of the metal tube, a quartz inner tube and a metal inner tube of the lower section of the metal tube are not provided, the gravity microwave-assisted grinding device adopts a single-tube structure consisting of a metal outer tube of the upper section of the metal tube, a quartz outer tube and a metal outer tube of the lower section of the metal tube, a heating cavity is formed in an inner hole of the metal outer tube of the upper section of the metal tube, the quartz outer tube and the metal outer tube of the lower section of the metal tube, and outer diameters of the metal outer tube of the upper section of the metal tube, the quartz outer tube and the metal outer tube of the lower section of the metal tube are respectively 20 cm;

when the feeding size calculated in step 3 is the size of the finely-ground products, the metal inner tube of the upper section of the metal tube, the quartz inner tube and the metal inner tube of the lower section of the metal tube are provided, and the gravity microwave-assisted grinding device adopts a double-tube structure consisting of the metal outer tube of the upper section of the metal tube, the quartz outer tube, the metal outer tube of the lower section of the metal tube, the metal inner tube of the upper section of the metal tube, the quartz inner tube and the metal inner tube of the lower section of the metal tube; and the outer tube and the inner tube form the heating cavity, outer diameters of the metal inner tube of the upper section of the metal tube, the quartz inner tube and the metal inner tube of the lower section of the metal tube are 5 cm, and when the penetration depth $L_p$ of the granular ores is less than 5 cm, the outer diameters of the metal inner tube of the upper section of the metal tube, the quartz inner tube and the metal inner tube of the lower section of the metal tube are increased to 10 cm; and step 7, conveying the ores, and performing heating, wherein the ores fall from the feeding hopper and pass through the heating cavity under an action of self-gravity, a microwave power of the microwave source is 100 kW, the ores are transferred into the heating cavity through the waveguide, the microwave energy is limited in the heating cavity under an action of the choke coil to prevent the microwave energy from escaping, the microwave energy in the heating cavity is used to heat the ores in a heating process of the ores, and in the heating process of the ores, if a spark phenomenon is severe, the feeding size of the ores is reduced; if a temperature distribution of the ores is becoming seriously polarized, the material thickness of the ores fed is reduced; in the heating process of the ores, high-speed cameras are used for shooting the macro phenomena during the ore irradiation, infrared thermal imagers are used for observing the temperature distribution of the ores, and the feeding size of step 3 and the discharging speed of step 5 are optimized; the heated ores enter the discharger and then enter the downstream grinding equipment through the discharger; if poor ore damage situations have no effect on ore grinding, an irradiation time are prolonged by reducing the discharging speed, and meanwhile, excess ores in the feeding bin are discharged from other outlets into another gravity double-tube microwave-assisted grinding device; and if ore sintering has a negative effect on the ore grinding, the microwave power is reduced.

2. The use method as claimed in claim 1, wherein the upper section of the metal tube and the lower section of the metal tube have the same structure, and include two situations, when the metal tube is the double-tube structure, the metal tube comprises the metal inner tube and the metal outer tube, and the metal outer tube sleeves on the metal inner tube; when the metal tube is the single-tube structure, the upper section of the metal tube and the lower section of the metal tube are respectively the metal outer tube of the upper section of the metal tube and the metal outer tube of the lower section of the metal tube; the quartz tube includes two situations, when the quartz tube is the double-tube structure, the quartz tube comprises the quartz inner tube and the quartz outer tube, and the quartz outer tube sleeves on the quartz inner tube; when the quartz tube is the single-tube structure, the quartz tube is the quartz outer tube; and when the quartz tube is the double-tube structure, inner tube sealing plugs are mounted in the metal inner tube and the quartz inner tube.

3. The use method as claimed in claim 2, wherein the outer diameters of the metal outer tube and the quartz outer tube are 20-23 cm.

4. The use method as claimed in claim 2, wherein the outer diameters of the metal inner tube and the quartz inner tube are determined by a type of the ores.

5. The use method as claimed in claim 1, wherein each of the shooting devices comprises a shielding box, the high-speed camera and the infrared thermal imager, wherein the high-speed cameras and the infrared thermal imagers are mounted in the shielding boxes, and the two shielding boxes are respectively mounted at the microwave input end and the microwave output end of the waveguide.

* * * * *